United States Patent
Takahashi et al.

(10) Patent No.: US 9,680,303 B2
(45) Date of Patent: Jun. 13, 2017

(54) POWER STORAGE SYSTEM AND POWER SOURCE SYSTEM

(71) Applicant: Hitachi Information & Telecommunication Engineering, Ltd., Nishi-ku, Yokohama-shi, Kanagawa-ken (JP)

(72) Inventors: Fumikazu Takahashi, Yokohama (JP); Yoshihide Takahashi, Yokohama (JP); Yusuke Katsuyama, Yokohama (JP); Kimiaki Taniguchi, Yokohama (JP); Akinori Uchida, Yokohama (JP); Masahiro Hamaogi, Yokohama (JP); Susumu Nagafuchi, Yokohama (JP)

(73) Assignee: Hitachi Information & Telecommunication Engineering, Ltd., Yokohama-shi (JP)

( * ) Notice: Subject to any disclaimer, the term of this patent is extended or adjusted under 35 U.S.C. 154(b) by 863 days.

(21) Appl. No.: 14/062,555

(22) Filed: Oct. 24, 2013

(65) Prior Publication Data
US 2014/0117756 A1 May 1, 2014

(30) Foreign Application Priority Data
Oct. 30, 2012 (JP) ................................ 2012-239663

(51) Int. Cl.
| H02J 7/00 | (2006.01) |
| H02J 3/38 | (2006.01) |
| H02J 7/35 | (2006.01) |

(52) U.S. Cl.
CPC ............ *H02J 3/383* (2013.01); *H02J 7/0019* (2013.01); *H02J 7/35* (2013.01); *Y02E 10/563* (2013.01);
(Continued)

(58) Field of Classification Search
CPC ........................................ H02J 7/0014–7/0019
See application file for complete search history.

(56) References Cited

U.S. PATENT DOCUMENTS

2010/0253284 A1* 10/2010 Aoki .................... H01M 10/441
320/118
2011/0296218 A1* 12/2011 Kim .......................... H02J 3/32
713/323

(Continued)

*Primary Examiner* — Jared Fureman
*Assistant Examiner* — Joel Barnett
(74) *Attorney, Agent, or Firm* — R. Neil Sudol; Henry D. Coleman

(57) ABSTRACT

A power storage system is provided with charge switches, discharge switches, a bidirectional DC/DC converter and a power storage system controller connecting all the battery packs to an external circuit to achieve parallel charge and discharge, and the power storage system starts the charge by setting a rated charge current value per one battery pack to Iset and setting the rated charge current value Iset as an initial value of a charge current command value Iref(1), thereafter monitor the charge current of each of the battery packs after elapse of a predetermined time so as to subtract its maximum value Ibmax(1) from the charge current command value Iref(1), and add the rated charge current value Iset to result of subtraction Ierr (Iref(1)−Ibmax(1)) so as to set as a new charge current command value Iref(2) and carry out pre-charge in such a manner as to carry on the charge.

13 Claims, 4 Drawing Sheets

(52) U.S. Cl.
CPC ......... *Y02E 10/566* (2013.01); *Y10T 307/344* (2015.04)

(56) References Cited

U.S. PATENT DOCUMENTS

2013/0293198 A1* 11/2013 Nakashima ........... H02J 7/0068
                                                            320/118
2014/0327400 A1* 11/2014 Kudo .................... H02J 7/0016
                                                            320/118

* cited by examiner $$Iref_{(1)} = Iset$$
$$Iref_{(2)} = Iset + Iref_{(1)} - Ibmax_{(1)}$$
$$Iref_{(3)} = Iset + Iref_{(2)} - Ibmax_{(2)}$$
$$\vdots$$
$$Iref_{(n)} = Iset + Iref_{(n-1)} - Ibmax_{(n-1)}$$

POWER STORAGE SYSTEM AND POWER SOURCE SYSTEM

BACKGROUND OF THE INVENTION

Field of the Invention

The present invention relates to a power storage system in which a plurality of battery packs are connected in parallel, and a power source system which is provided with the power storage system.

Description of the Conventional Art

Making a capacity of the power storage device large can be achieved by connecting a plurality of battery packs in parallel. However, in some voltage difference between the battery packs connected in parallel, great inrush current (cross current) flows from the battery pack having a higher terminal voltage toward the battery pack having a lower terminal voltage in the instant of connecting in parallel. The cross current causes a system down, for example, it brings about an abnormal state such as an over current and an over heat of the battery pack. As a result, there can be thought that the cross current is intended to be prevented by providing a charge switch and a discharge switch in each of the battery packs, and controlling the switches.

The cross current mentioned above is generated at the first starting time after the power storage device is installed, at the returning time from a long time stop or a fault, and at the replacing time of the partial battery pack.

As a countermeasure for preventing the cross current, there has been proposed a method of preventing the great cross current from being generated, by detecting the terminal voltage of each of the battery packs, and operating only the battery packs within a predetermined range of voltage difference in a state in which the battery packs can be charged and discharged in parallel.

PRIOR ART DOCUMENTS

Patent Documents

Patent Document 1: Japanese Unexamined Patent Publication No. 2009-33936
Patent Document 2: Japanese Unexamined Patent Publication No. 2012-34529

SUMMARY OF THE INVENTION

Problem to be Solved by the Invention

In the method of preventing the cross current in the conventional power storage device, since any sleeping battery pack exists under operation of the power storage device, all the battery packs installed in the power storage device can not be effectively used.

Therefore, an object of the present invention is to achieve a power storage system which can efficiently use all of a plurality of battery packs installed in a power storage device in a state in which the battery packs can be charged and discharged. Specifically, equalization of the terminal voltages of the battery packs are achieved for a short time so as to make all the battery packs in a state in which the battery packs can be charged and discharged in parallel, by carrying out a pre-charge (a preliminary charge) charging each of the battery packs while raising the charge current step by step without going beyond a rated charge current value of the battery pack.

Further, the other object of the present invention is to achieve a power source system which can carry out a stable electric power supply by using the power storage system.

Means for Solving the Problem

A feature of the present invention is to structure such as to charge all the battery packs in a plurality of battery packs connected in parallel so that differences of terminal voltages of all the battery packs is within a predetermined range, by applying pre-charge to all the battery packs, and to thereafter allow all the battery packs to be charged and discharged.

Further, with regard to a power storage system, there is provided a power storage system comprising a control means for controlling to charge and discharge all the battery packs in parallel while connecting all the battery packs of a plurality of battery packs connected in parallel to an external circuit, wherein the control means is structured such as to charge so that differences of terminal voltages of all the battery packs are within a predetermined range, by making all the battery packs in a chargeable state and carrying out pre-charge on the basis of application of electric power supply from the external circuit, and thereafter control to make all the battery packs in a chargeable and dischargeable state in relation to the external circuit.

The charge control by the control means in the pre-charge is carried out so as to start the charge by setting a rated charge current value per one battery pack to Iset and setting the rated charge current value Iset as an initial value of a charge current command value Iref(1), thereafter monitor the charge current of each of the battery packs after elapse of a predetermined time so as to subtract its maximum value Ibmax(1) from the charge current command value Iref(1), and add the rated charge current value Iset to result of subtraction Ierr (Iref(1)−Ibmax(1)) so as to set a new charge current command value Iref(2) and carry on the charge. As a result, equalization of the terminal voltage of each of the battery packs can be realized for a short time without going beyond the rated charge current value of the battery pack.

Further, each of the battery packs is provided with a storage battery, and a charge switch and a discharge switch which are connected in series to the storage battery, and the control means is provided with a bidirectional DC/DC converter which controls the charge and discharge of the battery pack, and a power storage system controller which controls the DC/DC converter, the charge switch and the discharge switch.

Further, with regard to a power source system, there is provided a power source system comprising:
a commercial power source circuit which connects a commercial power source and a load;
a solar light power generation panel;
a series circuit of a DC/DC converter and an inverter for supplying an output of the solar light power generation panel to the commercial power source circuit;
a power source switching circuit which connects the inverter to the commercial power source circuit; and
a power source system controller which controls these elements,
wherein the power storage system is connected while using the series connection portion of the DC/DC converter and the inverter as an external circuit.

Alternatively, there is provided a power source system comprising:
a series circuit of an AC/DC converter and a DC/DC converter for supplying an electric power to an information device from a commercial power source; and a power source system controller which controls these elements, wherein the power storage system is connected while using the series connection portion of the AC/DC converter and the DC/DC converter as an external circuit.

Effect of the Invention

Since the power storage system according to the present invention is structured such as to charge all of a plurality of battery packs connected in parallel, so as to control the differences between the terminal voltages within the predetermined range on the basis of the pre-charge, and thereafter allow all the battery packs to be charged and discharged, it is possible to efficiently use all the battery packs.

Specifically, it is possible to achieve the equalization of the terminal voltage of each of the battery packs for a short time, and it is possible to make all the battery packs in the chargeable and dischargeable state in parallel, by carrying out the pre-charge which charges each of the battery packs while raising the charge current step by step without going beyond the rated charge current value.

Further, the power source system according to the present invention can carry out the stable electric power supply by using the power storage system.

DETAILED DESCRIPTION OF PREFERRED EMBODIMENTS

Figure 1:
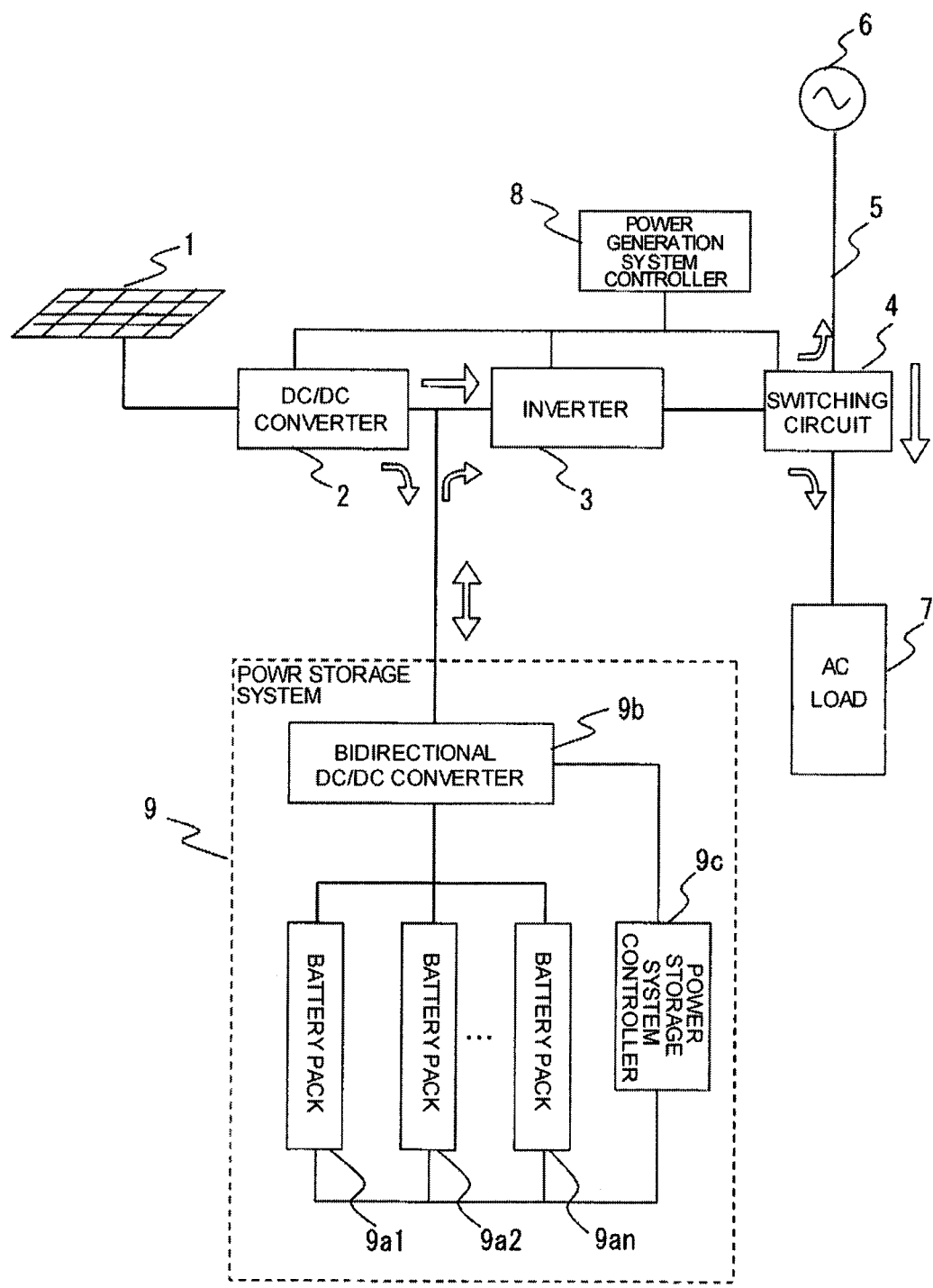
FIG. 1 is a block diagram showing an embodiment of a solar light power generation system to which the present invention is applied.

A power storage system according to the present invention is structured such as to be provided with a control means for controlling to charge and discharge all the battery packs in parallel while connecting all the battery packs of a plurality of battery packs connected in parallel to an external circuit, each of the battery packs is provided with a storage battery, and a charge switch and a discharge switch which are connected in series to the storage battery, the control means is structured such as to be provided with a bidirectional DC/DC converter which controls the charge and discharge of the battery pack, and a power storage system controller which controls the DC/DC converter, a charge switch and a discharge switch, the control means is structured such as to charge so that differences of terminal voltages of all the battery packs are within a predetermined range, by making all the battery packs in a chargeable state and carrying out pre-charge on the basis of application of electric power supply from the external circuit, and thereafter control to make all the battery packs in a chargeable and dischargeable state in relation to the external circuit.

Further, the control means is structured such that the charge control in the pre-charge, for example, the system starting time or the maintaining and replacing time of the battery pack is carried out so as to start the charge by setting a rated charge current value per one battery pack to Iset and setting the rated charge current value Iset as an initial value of a charge current command value Iref(1), thereafter monitor the charge current of each of the battery packs after elapse of a predetermined time so as to subtract its maximum value Ibmax(1) from the charge current command value Iref(1), and add the rated charge current value Iset to result of subtraction Ierr (Iref(1)−Ibmax(1)) so as to set a new charge current command value Iref(2) and carry on the charge. As a result, equalization of the terminal voltage of each of the battery packs can be realized for a short time without going beyond the rated charge current value of the battery pack.

Further, a power source system is provided with a commercial power source circuit which connects a commercial power source and a load, a solar light power generation panel, a series circuit of a DC/DC converter and an inverter for supplying an output of the solar light power generation panel to the commercial power source circuit, a power source switching circuit which connects the inverter to the commercial power source circuit, and a power source system controller which controls these elements, and the power storage system is connected while using the series connection portion of the DC/DC converter and the inverter as an external circuit.

Alternatively, in a power source system provided with a series circuit of an AC/DC converter and a DC/DC converter for supplying an electric power to an information device from a commercial power source, and a power source system controller which controls these elements, the power storage system is connected while using the series connection portion of the AC/DC converter and the DC/DC converter as an external circuit.

Embodiment 1

FIG. 1 is a block diagram of a solar light power generation system to which the present invention is applied.

In the solar light power generation system, a solar light power generation panel 1 is connected to a commercial power source circuit 5 via a DC/DC converter 2, an inverter 3 and a power source switching circuit 4. The commercial power source circuit 5 is a circuit means for connecting a commercial power source 6 and an AC load 7. In the case that an AC electric power output by converting generation power of the solar light power generation panel 1 is sufficiently large, the power source switching circuit 4 functions so as to supply (consume) the electric power to the AC load 7 and transmit (sell) the electric power to the commercial power source 6. In the case that the output AC electric power is small, the power source switching circuit 4 functions so as to supply (purchase) the electric power of the commercial power source 6 to the AC load 7. The function in the solar light power generation system is achieved by a control process by a power generation system controller 8 which is constructed by centering on a microprocessor.

In other words, the power generation system controller 8 executes a state monitoring and a control of the DC/DC converter 2 and the inverter 3, a state monitoring of the commercial power source 6, a control of the power source switching circuit 4, and a process of information exchanging communication (a communication) with a power storage system controller of a power storage system mentioned later.

The power storage system 9 is provided with a plurality of battery packs $9a1, 9a2, \ldots, 9an$ which are connected in parallel, a bidirectional DC/DC converter $9b$ which serves as an external circuit for charging and discharging a plurality of battery packs 9a1 to 9an connected in parallel, and is connected to a series connection portion (a direct current path) of the DC/DC converter 2 and the inverter 3, and a power storage system controller 9c which is constructed by centering on the microprocessor.

The power storage system controller 9c is structured such as to carry out a state monitoring and a charge and discharge control of each of the battery packs 9a1 to 9an and the bidirectional DC/DC converter 9b, and a communication process with the power generation system controller 8.

The power storage system 9 in the solar light power generation system structured as mentioned above functions as follows on the basis of the control by the power storage system controller 9c. In other words, the power storage system controller 9c first of all monitors each of states of the battery packs 9a1 to 9an by a communication line (not shown). Further, in the case that a power storage remaining amount or a terminal voltage is lacking or in the case that the power storage system controller determines that a pre-charge (a preliminary charge) is necessary, the power storage system controller is communicated with a power generation system controller 8 so as to exchange information for inquiring whether or not the battery packs 9a1 to 9an can be electrically charged. The power generation system controller 8 receiving the inquiry about the electrical charge transmits charge allowing information to the power storage system controller 9c in the case that the power generation system controller 8 determines on the basis of the result of monitoring the states of the DC-DC converter 2 and the inverter 3 that the generated power of the solar light power generation panel 1 is in a state of enabling the charge of the battery packs 9a1 to 9an. Further, the power storage system controller 9c receiving the charge allowing information executes a control process of charging (pre-charging or auxiliary charging) the battery packs 9a1 to 9an while using an output of the DC/DC converter 2 as a power source, by controlling the bidirectional converter 9b and the battery packs 9a1 to 9an. For example, in a structure in which a lithium ion secondary battery is applied to the battery pack, constant current-constant voltage charge is necessary, however, a charge control portion (a feedback control portion of the bidirectional DC/DC converter 9b) for this purpose may be embedded in the bidirectional DC/DC converter 9b, or may be embedded in the power storage system controller 9c side. In the former case, the power storage system controller 9c issues instruction of executing the charge to the DC/DC converter 2. In the latter case, the power storage system controller 9c transmits a pulse width modulation (PWM) signal which is necessary for a switching motion, to the DC/DC converter 2.

In the case that the power generation system controller 8 determines on the basis of a condition monitoring of DC/DC converter 2 and the inverter 3 and a condition monitoring of the commercial power system 9 that it is preferable to supply electric power to the AC load 7 from the power storage system 9, the power generation system controller 8 inquires the power storage system controller 9c of the power storage system 9 about whether or not the electric power can be supplied. In the case that the power storage system controller 9c which is inquired about whether or not the electric power can be supplied determines on the basis of a condition monitoring of the battery packs 9a1 to 9an that the electric power can be supplied by discharging the battery packs 9a1 to 9an, the power storage system controller 9c transmits to the power generation system controller 8 the information that the electric power can be supplied. The power generation system controller 8 receiving the information that the electric power can be supplied changes the control to the control for receiving the electric power from the power storage system 9, and transmits to the power storage system controller 9c the electric power supply instructing information.

In the case that the power storage system controller 9c receives the electric power supply instructing information from the power generation system controller 8, the power storage system controller 9c controls the battery packs 9a1 to 9an and the bidirectional DC/DC converter 9b so as to set the battery packs 9a1 to 9an to the electrically dischargeable state and starts the control for supplying the electric power to the inverter 3 by the bidirectional DC/DC converter 9b.

The power generation system controller 8 transmitting the electric power supply instructing information controls the inverter 2 and the power source switching circuit 4 so as to supply the electric power supplied from the power storage system 9 to the AC load 7.

In the discharge control, in the same manner as the charge control mentioned above, the feedback control portion of the bidirectional DC/DC converter 9b may be embedded in the bidirectional DC/DC converter 9b side or may be embedded in the power storage system controller 9c side.

According to the solar light power generation system mentioned above, the power selling amount from the commercial power source 6 can be reduced by supplying the power storage energy of the battery packs 9a1 to 9an to the inverter 3 so as to supply the electric power to the AC load 7 in the case that the generated electric power of the solar light power generation panel 1 is lowered. Alternatively, the electric power can be normally supplied to the AC load 7 even in the case that the commercial power source 6 breaks down and the generated electric power of the solar light power generation panel 1 is lowered.

In the meantime, the respective battery packs 9a1 to 9an which are connected in parallel are set to the chargeable and dischargeable state in parallel in a normal operating state, however, the respective battery packs 9a1 to 9an are different in the power storage remaining amount or the terminal voltage, for example, in an initial stage of constructing the system. Accordingly, if the respective battery packs 9a1 to 9an are set to the chargeable and dischargeable state in parallel in the case that the difference in the terminal voltages is great, a great cross current is generated.

In order to prevent the generation of the great cross current mentioned above, the power storage system 9 is structured such as to pre-charge all the battery packs 9a1 to 9an in a plurality of battery packs 9a1 to 9an which are connected in parallel, charge so that the differences of the terminal voltage of all the battery packs 9a1 to 9an are within a predetermined range, and thereafter set all the battery packs 9a1 to 9an the chargeable and dischargeable state in parallel, on the basis of the control by the power storage system controller 9c, at the first starting time after the installation of the system, at the returning time from the long time stop or the fault of the power storage system 9 or the replacing time of a part of the battery packs.

Figure 2:
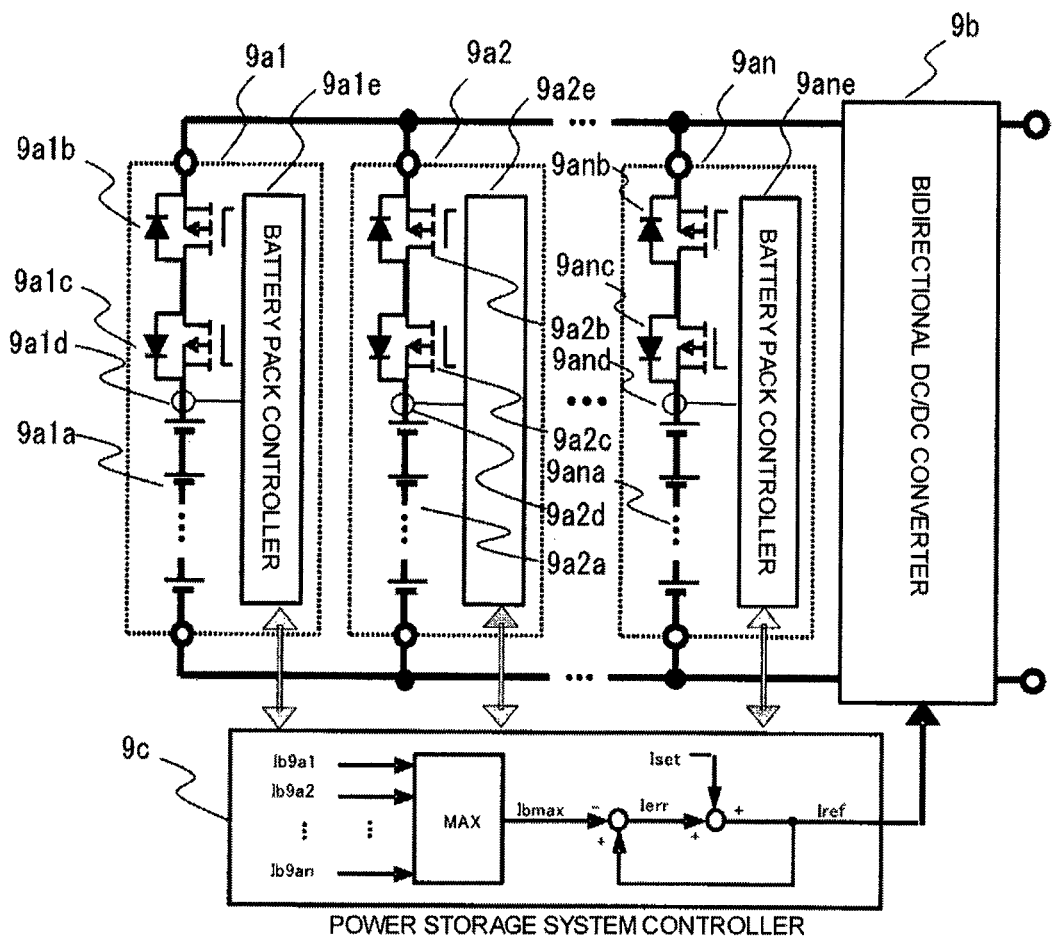
FIG. 2 is a block diagram of a power storage system shown in FIG. 1.

FIG. 2 is a block diagram of the power storage system 9 according to the embodiment.

A plurality of battery packs 9a1 to 9an all have the same structure, and are respectively provided with storage batteries 9a1a to 9ana, charge switches 9a1b to 9anb, discharge switches 9a1c to 9anc and voltage and current sensors 9a1d to 9 and which are connected in series to the storage batteries, and battery pack controllers 9a1e to 9ane.

Each of the storage batteries 9a1a to 9ana are constructed, for example, by a assembled battery obtained by connecting a plurality of lithium ion secondary battery cells in series or in parallel.

Each of the charge switches 9a1b to 9anb are constructed by a semiconductor switch (for example, a power MOSFET) which controls whether or not the electric current can be applied in the charging direction and a diode which is back-to-back connected to the semiconductor switch. In place of the diode, a body diode formed as a parasitic element in the semiconductor switch may be employed.

Each of the discharge switches 9a1c to 9anc is constructed by a semiconductor switch (for example, a power MOSFET) which controls whether or not the electric current can be applied in the discharging direction and a diode which is back-to-back connected to the semiconductor switch. In place of the diode, a body diode formed as a parasitic element in the semiconductor switch may be employed.

Each of the voltage and current sensors 9a1d to 9 and detects each of the battery cell voltages and the terminal voltage (the total voltage) of the storage batteries 9a1a to 9ana, the charge current and the discharge current.

Each of the battery pack controllers 9a1e to 9ane is constructed mainly by a microprocessor, inputs the terminal voltages of the storage batteries 9a1a to 9ana of the battery packs 9a1 to 9an and the detection values of the charge current and the discharge current, and controls whether or not each of the charge switches 9a1b to 9anb and each of the discharge switches 9a1c to 9anc can be excited, while communicating with the power storage system controller 9c.

The power storage system controller 9c in the power storage system 9 structured as mentioned above comprehends the power storage remaining amount and the terminal voltage of each of the battery packs 9a1 to 9an by communicating with each of the battery pack controllers 9a1e to 9ane so as to monitor the terminal voltage and the charge and discharge currents of each of the storage batteries 9a1a to 9ana in each of the battery packs 9a1 to 9an, controls each of the battery packs 9a1 to 9an to the charge state (in which only the charge switches 9a1b to 9anb are excited) or the discharge state (in which only the discharge switches 9a1c to 9anc are excited) or the charge and discharge state (in which both the charge switches 9a1b to 9anb and the discharge switches 9a1c to 9anc are excited) in correspondence to the power storage remaining amount and the terminal voltage of each of the battery packs 9a1 to 9an, and executes a process for controlling the bidirectional DC/DC converter 9b.

The control whether or not each of the charge and discharge switches 9a1b to 9anb and 9a1c to 9anc can be excited may be structured such as to be executed by the battery pack controllers 9a1e to 9ane, or may be structured such as to be controlled by the power storage system controller. Alternatively, the control may be structured such that the control can be executed by both of the battery pack controllers 9a1e to 9ane and the power storage system controller 9c.

Since the electric charge for pre-charging which is executed by the power storage system 9 in the initial stage of the operation achieves the equalization of the power storage remaining amount or the terminal voltage of each of the battery packs 9a1 to 9an for a short time by charging each of the battery packs 9a1 to 9an while raising the charge current step by step without going beyond a rated charge current value of the battery packs 9a1 to 9an, the power storage system controller 9c starts the electric charge by setting the rated charge current value per one battery pack to Iset, and setting a rated charge current value Iset while setting a charge current command value Iref(1) of the charging means constructed by using the bidirectional DC/DC converter 9b to an initial value, thereafter subtracting the maximum value Ibmax(1) from the charge current command value Iref(1) by monitoring the charge current of each of the battery packs 9a1 to 9an after a predetermined time has passed, carries out the electric charge by adding the rated charge current value Iset to a result of subtraction Ierr(Iref(1)−Ibmax(1)) so as to set a new charge current command value Iref(2), further thereafter subtracts the maximum value Imax(2) from the charge current command value Iref(2) by monitoring the charge current of each of the battery packs 9a1 to 9an after a predetermined time has passed, and continuously raises the charge current command value Iref step by step in such a manner as to carry out the electric charge by adding the rated charge current value Iset to a result of subtraction Ierr(Iref(2)−Ibmax(2)) so as to set a new charge current command value Iref(3).

The rise of the charge current command value Iref as mentioned above is carried out n times within a range that the maximum value Ibmax of the detected charge current of each of the battery packs 9a1 to 9an does not go beyond the rated charge current value Iset, as follows.

$$Iref(1) = Iset$$
$$Iref(2) = Iset + Iref(1) - Ibmax(1)$$
$$Iref(3) = Iset + Iref(2) - Ibmax(2)$$
$$\cdots \cdots$$
$$Iref(n) = Iset + Iref(n-1) - Ibmax(n-1)$$

The electric charge for pre-charging is finished when the power storage system controller 9c computes the difference of the power storage remaining amount or the terminal voltage of each of the battery packs 9a1 to 9an on the basis of the terminal voltage or the charge current of each of the storage batteries 9a1a to 9ana acquired from the battery pack controllers 9a1e to 9ane of the battery packs 9a1 to 9an, and the result of computation reaches a predetermined range.

It is possible to structure such that the pre-charge is finished in the case that the charge current maximum value Ibmax becomes equal to or less than a predetermined charge end current value before the result of computation reaches the predetermined range. Here, the charge end current value means a current threshold value for determining that the battery is fully charged. Specifically, in a structure which executes a constant current-constant voltage charge corresponding to a general charge method of the lithium ion battery, the charge current is going to be reduced after changing to the constant voltage charge, however, the charge operation is completely stopped by determining the full charge in the case that the charge current becomes equal to or less than a certain charge current. The current value at this time is the charge end current value.

When the pre-charge is finished, the power storage system 9 sets each of the battery packs 9a1 to 9an to the parallel state so as to come to the chargeable and dischargeable state.

In the meantime, in the case that the feedback control portion of the bidirectional DC/DC converter 9b is embedded in the DC/DC converter 9b side as mentioned above, the charge current command value Iref is transmitted to the feedback control portion from the power storage system controller 9c. The feedback control portion receiving this carries out a process of rewriting the current charge current command value to a newly received command value, whereby the pre-charge operation mentioned above can be achieved.

Figure 3:
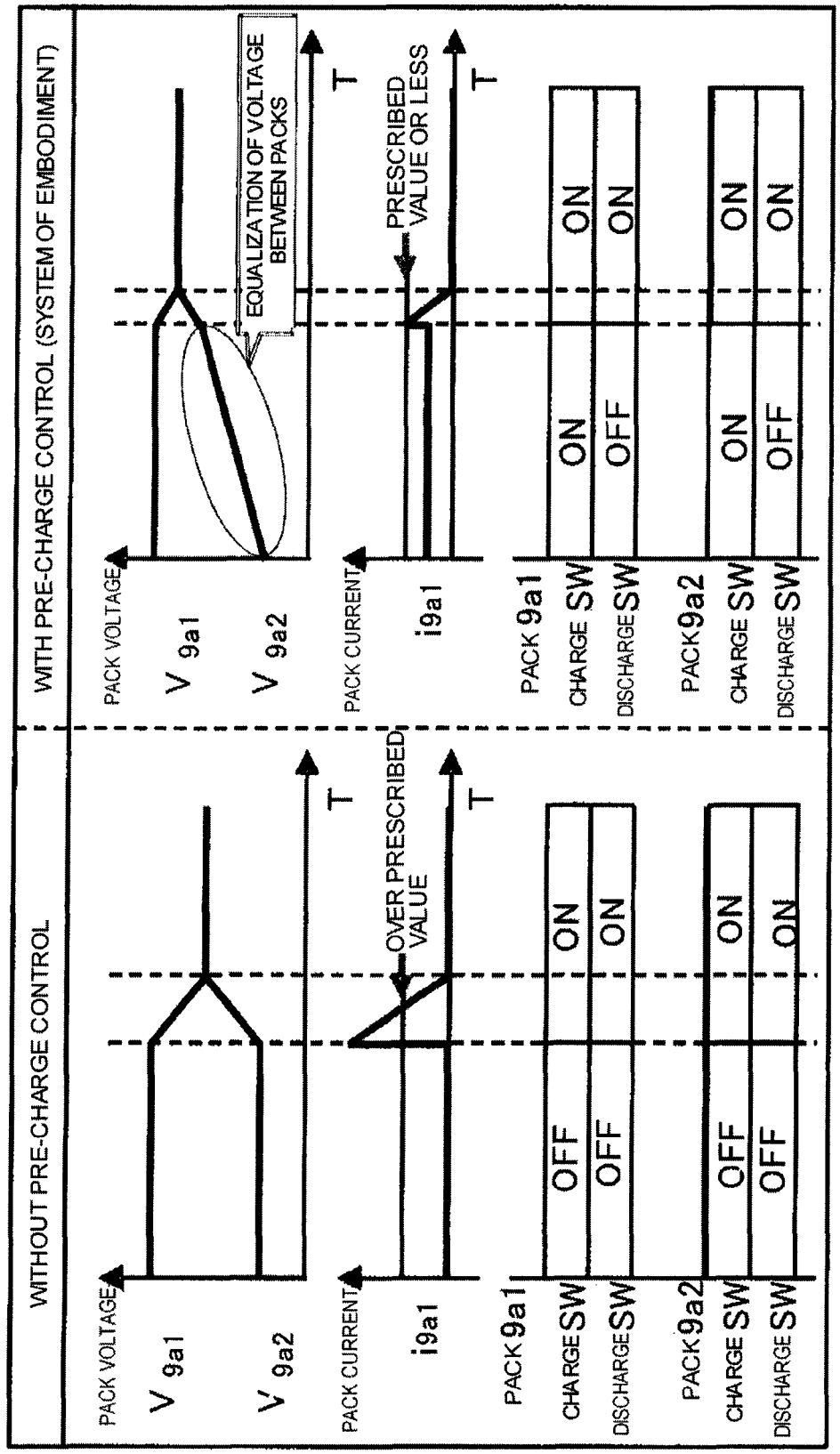
FIG. 3 is a time chart showing a state of a battery pack according to with or without pre-charge control by the power storage system.

FIG. 3 is a time chart which exemplifies a state of the battery pack according to with or without the pre-charge control. The time chart exemplifies a case that the terminal voltage of the battery pack 9a1 is higher than the terminal voltage (the pack voltage) of the battery pack 9a2 in the case that the battery packs 9a1 and 9a2 are targeted.

In the case that the charge switches (the charge SW) 9a1b and 9a2b and the discharge switches (the discharge SW) 9a1c and 9a2c of both the battery packs 9a1 and 9a2 are turned on (ON) without the pre-charge control under the above state, a great discharge current (cross current) (pack current) i9a1 is generated in the battery pack 9a1. A value of the discharge current i9a1 goes beyond a prescribed value and comes to an over current in the case that a voltage difference between both the battery pack 9a1 and 9a2 is great.

However, in the case that the pre-charge control is carried out as the embodiment, the pre-charge is carried out so that the difference of the terminal voltage (pack voltage) between both the battery packs 9a1 and 9a2 is within a predetermined value, first of all by setting only the charge switches (the charge SW) 9a1b and 9a2b of both the battery packs 9a1 and 9a2 to the exciting state (ON) so as carry out the pre-charge, before setting both the charge switches (the charge SW) 9a1b and 9a2b and the discharge switches (the discharge SW) 9a1c and 9a2c of both the battery packs 9a1 and 9a2 to the exciting state (ON) when a difference equal to or more than a predetermined value exists in the terminal voltages (pack voltages) of both the battery packs 9a1 and 9a2. Since the discharge switches (the discharge SW) 9a1c and 9a2c of both the battery packs 9a1 and 9a2 are both set to the exciting state (ON) thereafter, the voltage difference between both the battery packs 9a1 and 9a2 is small. Therefore, the value of the discharge current (cross current) (pack current) generated in the battery pack i 9a1 is held down to a prescribed value or less.

Further, since the power storage system controller 9c is communicated with the battery pack controllers 9a1e to 9ane of the respective battery packs 9a1 to 9an, the power storage system controller can acquire the exchanging information if any battery pack is exchanged during the operation for maintaining. Therefore, in the case that the power storage system controller 9c acquires the exchanging information of the battery pack, the power storage system controller 9c inhibits the charge switch and the discharge switch of the newly installed battery pack from exciting, and acquires the information of the terminal voltage of the other battery storage pack and the terminal voltage of the newly installed battery pack so as to compute the voltage difference. In the case that the result of computation (the voltage difference) is within a predetermined range, the charge switch and the discharge switch of the newly installed battery pack are excited and the newly installed battery pack is set to the chargeable and dischargeable state. However, in the case that the result of computation is beyond the predetermined range and the system is under a state in which the system can carry out the pre-charge, the pre-charge as mentioned above is executed, and the charge switches 9a1b to 9anb and the discharge switches 9a1c to 9anc of all the battery packs are excited when the difference of the terminal voltages of the battery packs 9a1 to 9an reaches the predetermined range, whereby all the battery packs including the newly installed battery pack are set to the chargeable and dischargeable state.

The power storage system 9 may be modified to charge by using the electric power from the commercial power source 6 together. The modification can be achieved by connecting an AC/DC converter in parallel to the inverter 3, and structuring such as to charge the battery packs 9a1 to 9an by supplying the electric power of the commercial power source 6 to the bidirectional DC/DC converter 9b of the power storage system 9 via the AC/DC converter in the case of charging the battery packs 9a1 to 9an when the output voltage of the DC/DC converter 2 for converting the generated electric power of the solar light power generation panel 1 is small. Further, the same charge can be achieved by structuring the inverter 3 such that the inverter 3 can convert the electric power in a bidirectional direction, without provision of the AC/DC converted in parallel.

Embodiment 2

Figure 4:
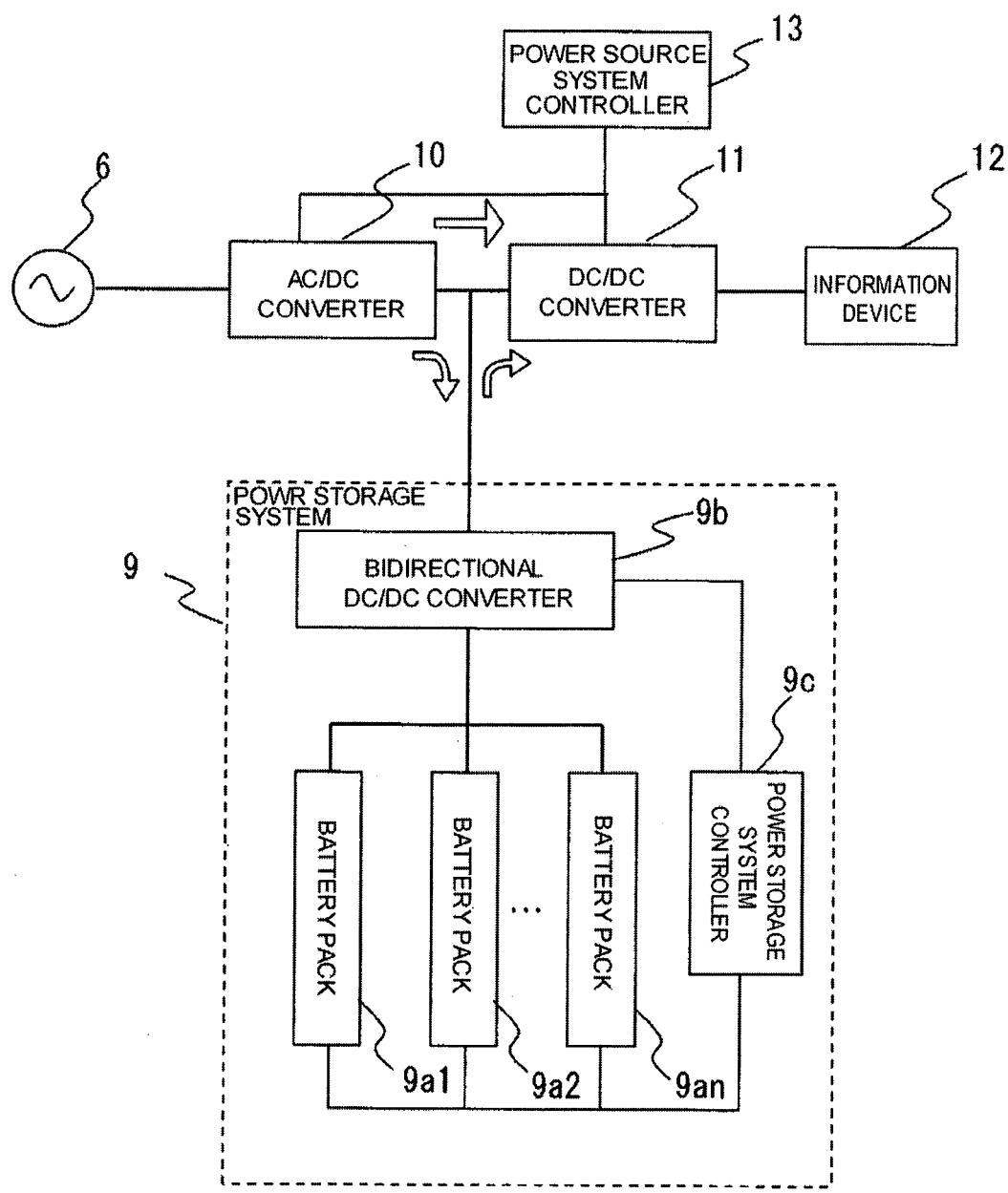
FIG. 4 is a block diagram showing an embodiment of an information device power source system to which the present invention is applied.

FIG. 4 is a block diagram of an information device power source system to which the present invention is applied.

The information device power source system is structured such that the electric power of the commercial power source 6 is supplied to an information device 12 via an AC/DC converter 10 and a DC/DC converter 11, and a power source system controller 13 executes a power source supply control in the information device power source system.

Further, the power storage system 9 connects the bidirectional DC/DC converter 9b to a series connection portion (a direct current path) between the AC/DC converter 10 and the DC/DC converter 11 in the information device power source system.

The power storage system 9 is structured in the same manner as the power storage system 9 in the solar light power generation system mentioned above, and the power storage system controller 9c controls the battery pack 9a and the bidirectional DC/DC converter 9b while communicating with the power source system controller 13.

The information device power source system structured as mentioned above normally supplies the direct current electric power to the information device 12 by functioning the AC/DC converter 10 and the DC/DC converter 11 according to the control by the power source system controller 13.

The power storage system 9 carries out information exchange which inquires whether or not the battery pack 9a can be charged, by communicating with the power source system controller 13 in the case that the power storage remaining amount or the terminal voltage is short or the pre-charge is determined to be necessary, as a result of monitoring the state of the battery pack 9a, on the basis of the control by the power storage system controller 9c. The power source system controller 13 inquired about whether or not the charge can be executed transmits the charge allowing information to the power storage system controller 9c in the case that the power source system controller determines that the battery pack 9a is in the chargeable state, on the basis of the result of the condition monitoring of the AC/DC converter 10 and the DC/DC converter 11. Further, the power storage system controller 9c receiving the charge allowing information executes a control process of charging (pre-charging or auxiliary charging) the battery pack 9a in the same manner as the embodiment mentioned above while using an output of the AC/DC converter 10 as a power source, by controlling the bidirectional converter 9b and the battery pack 9a.

Further, the power source system controller 13 carries out communication of inquiring about whether or not the electric power can be supplied to the power storage system controller 9c of the power storage system 9, in the case that the power source system controller determines that it is preferable to supply electric power to the information device 12 from the power storage system 9, on the basis of the condition monitoring of the AC/DC converter 10 and the condition monitoring of the commercial power source 6. The power storage system controller 9c receiving the inquiry about whether or not the electric power can be supplied transmits information that the electric power can be supplied, to the power source system controller 13, in the case that the power storage system controller determines that the electric power can be supplied by discharging the battery pack 9a on the basis of the condition monitoring of the battery pack 9a. The power source system controller 13 receiving the information that the electric power can be supplied changes to a control of receiving the electric power from the power storage system 9, and transmits the information that the electric power can be supplied, to the power storage system controller 9c.

The power storage system controller 9c sets the battery pack 9a to the dischargeable state by controlling the battery pack 9a and the bidirectional DC/DC converter 9b and starts supplying the electric power to the DC/DC converter 11 by the bidirectional DC/DC converter 9b, in the case that the power storage system controller 9c receives the electric power supply instructing information from the power source system controller 13.

The power source system controller 13 transmitting the electric power supply instructing information controls the AC/DC converter 10 and the DC/DC converter 11 in such a manner as to supply the electric power supplied from the power storage system 9 to the information device 12.

According to the information device power source system mentioned above, since the electric power can be supplied to the information device 12 by using the power storage of the battery pack 9a, the electric power can be supplied to the information device 12 even in the case that the commercial power source 6 breaks down.

Further, the power storage system 9 can achieve the equalization of the power storage remaining amount or the terminal voltage of the battery packs connected in parallel, for a short time by charting the battery pack 9a while raising the charge current step by step without going beyond the rated charge current value of the battery pack 9a.

What is claimed is:

1. A power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs, wherein said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit, wherein said control means is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge.

2. A power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs, wherein said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit, wherein said control means is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge.

3. A power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs, wherein said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit, wherein said control means is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge, each of said battery packs is provided with a storage battery, and a charge switch and a discharge switch which are connected in series to said storage battery, and said control means is provided with a bidirectional DC/DC converter which controls the charge and discharge of said battery pack, and a power storage system controller which controls said DC/DC converter, the charge switch and the discharge switch, wherein said battery pack is provided with an assembled battery which is formed by connecting a plurality of lithium ion secondary battery cells in series or in parallel.

4. A power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs, wherein said control means is structured such as to make all of the plurality of battery packs in a chargeable state and carrying out pre-charge on the basis of application of electric power supply from said external circuit, and thereafter control to make all of the plurality of battery packs in a chargeable and dischargeable state in relation to said external circuit, wherein said pre-charge is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out a constant current charge for carrying on the charge, and the pre-charge is finished in the case that the charge current becomes equal to or less than a charge end current value by thereafter carrying out a constant voltage charge.

5. A power source system comprising:
a commercial power source circuit which connects a commercial power source and a load;
a solar light power generation panel;
a series circuit of a DC/DC converter and an inverter for supplying an output of said solar light power generation panel to the commercial power source circuit;
a power source switching circuit which connects said inverter to the commercial power source circuit; and
a power source system controller which controls these elements,
wherein the power storage system according to claim 4 is connected while using a connection portion which connects in series said DC/DC converter and the inverter as an external circuit.

6. A power source system comprising:
a series circuit of an AC/DC converter and a DC/DC converter for supplying an electric power to an information device from a commercial power source, and a power source system controller which controls these elements,
wherein the power storage system according to claim 4 is connected while using a connection portion which connects in series said AC/DC converter and the DC/DC converter as an external circuit.

7. A power source system comprising:
a commercial power source circuit which connects a commercial power source and a load;
a solar light power generation panel;
a series circuit of a DC/DC converter and an inverter for supplying an output of said solar light power generation panel to the commercial power source circuit;
a power source switching circuit which connects said inverter to the commercial power source circuit; and
a power source system controller which controls these elements,
wherein a power storage system is connected while using a connection portion which connects in series said DC/DC converter and the inverter as an external circuit,
a power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs,
wherein said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit, wherein said control means of the power storage system is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge.

8. A power source system comprising:
a commercial power source circuit which connects a commercial power source and a load;
a solar light power generation panel;
a series circuit of a DC/DC converter and an inverter for supplying an output of said solar light power generation panel to the commercial power source circuit;
a power source switching circuit which connects said inverter to the commercial power source circuit; and
a power source system controller which controls these elements,
wherein a power storage system is connected while using a connection portion which connects in series said DC/DC converter and the inverter as an external circuit,
a power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs,
wherein said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit,
said control means of the power storage system is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge,
wherein each of said battery packs according to the power storage system is provided with a storage battery, and a charge switch and a discharge switch which are connected in series to said storage battery, and said control means is provided with a bidirectional DC/DC converter which controls the charge and discharge of said battery pack, and a power storage system controller which controls said DC/DC converter, the charge switch and the discharge switch.

9. A power source system comprising:
a commercial power source circuit which connects a commercial power source and a load;
a solar light power generation panel;
a series circuit of a DC/DC converter and an inverter for supplying an output of said solar light power generation panel to the commercial power source circuit;
a power source switching circuit which connects said inverter to the commercial power source circuit; and
a power source system controller which controls these elements,
wherein a power storage system is connected while using a connection portion which connects in series said DC/DC converter and the inverter as an external circuit,
a power storage system comprising a control means for controlling to charge and discharge a plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs,
wherein said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit,
wherein said control means of the power storage system is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge,
wherein each of said battery packs according to the power storage system is provided with a storage battery, and a charge switch and a discharge switch which are connected in series to said storage battery, and said control means is provided with a bidirectional DC/DC converter which controls the charge and discharge of said battery pack, and a power storage system controller which controls said DC/DC converter, the charge switch and the discharge switch, wherein said battery pack is provided with an assembled battery which is formed by connecting a plurality of lithium ion secondary battery cells in series or in parallel.

10. A power source system comprising:

a series circuit of an AC/DC converter and a DC/DC converter for supplying an electric power to an information device from a commercial power source, wherein the power storage system is connected while using a connection portion which connects in series said AC/DC converter and the DC/DC converter as an external circuit, a power storage system comprising a control means for controlling to charge and discharge all of the plurality of battery packs in parallel while connecting all of the plurality of battery packs in parallel to an external circuit, each of said battery packs of said plurality of battery packs being provided with a storage battery and further provided with a charge switch and a discharge switch which are connected in series to said storage battery, said control means including a bidirectional DC/DC converter which controls the charge and discharge of said battery packs of said plurality of battery packs, said control means further including a power storage system controller which controls said DC/DC converter and the charge switch and the discharge switch of each of said battery packs of said plurality of battery packs, said control means is structured such as to charge so that differences of voltages of all of the plurality of battery packs are within a predetermined range, by making all of the plurality of battery packs in a chargeable state and carrying out pre-charge on the basis of application of electric power supply from said external circuit, and thereafter control to make all of the plurality of battery packs in a chargeable and dischargeable state in relation to said external circuit.

11. The power source system according to claim 10, wherein said control means of the power storage system is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge.

12. The power source system according to claim 10, said control means of the power storage system is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge, wherein each of said battery packs according to the power storage system is provided with a storage battery, and a charge switch and a discharge switch which are connected in series to said storage battery, and said control means is provided with a bidirectional DC/DC converter which controls the charge and discharge of said battery pack, and a power storage system controller which controls said DC/DC converter, the charge switch and the discharge switch.

13. The power source system according to claim 10, said control means of the power storage system is structured such as to start the charge by setting a rated charge current value per one battery pack to Iset and setting said rated charge current value Iset as an initial value of a charge current command value Iref(1), thereafter monitor the charge current of all of the plurality of battery packs after elapse of a predetermined time so as to subtract its maximum value Ibmax(1) from said charge current command value Iref(1), and add said rated charge current value Iset to result of subtraction Ierr (Iref(1)−Ibmax(1)) so as to set as a new charge current command value Iref(2) and carry out control of said pre-charge in such a manner as to carry on the charge, each of said battery packs of the power storage system is provided with a storage battery, and a charge switch and a discharge switch which are connected in series to said storage battery, and said control means is provided with a bidirectional DC/DC converter which controls the charge and discharge of said battery pack, and a power storage system controller which controls said DC/DC converter, the charge switch and the discharge switch, wherein said battery pack is provided with an assembled battery which is formed by connecting a plurality of lithium ion secondary battery cells in series or in parallel.

* * * * *